US008249462B2

(12) United States Patent
Budde et al.

(10) Patent No.: US 8,249,462 B2
(45) Date of Patent: Aug. 21, 2012

(54) LIGHTING SYSTEM WITH LIGHTING UNITS USING OPTICAL COMMUNICATION

(75) Inventors: Wolfgang Otto Budde, Aachen (DE); Bozena Erdmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1018 days.

(21) Appl. No.: 12/281,959

(22) PCT Filed: Feb. 26, 2007

(86) PCT No.: PCT/IB2007/050603

§ 371 (c)(1), (2), (4) Date: Sep. 5, 2008

(87) PCT Pub. No.: WO2007/102097

PCT Pub. Date: Sep. 13, 2007

(65) Prior Publication Data

US 2009/0026966 A1 Jan. 29, 2009

(30) Foreign Application Priority Data

Mar. 7, 2006 (EP) .................................... 06110751

(51) Int. Cl.
*H04B 10/12* (2006.01)

(52) U.S. Cl. ......................... 398/141; 398/140; 398/156

(58) Field of Classification Search .................. 398/140, 398/141, 156, 164, 131, 129, 122, 127
See application file for complete search history.

(56) References Cited

U.S. PATENT DOCUMENTS 5,592,321 A * 1/1997 Elberbaum .................... 398/45
(Continued)

FOREIGN PATENT DOCUMENTS

WO 03077610 9/2003
(Continued)

OTHER PUBLICATIONS

D. Jablon. Strong Password-Only Authenticated Key Exchange, Integrity Sciences, Inc., Westboro MA, Sep. 1996.

(Continued)

*Primary Examiner* — M. Reza Sedighian
(74) *Attorney, Agent, or Firm* — Mark L. Beloborodov

(57) ABSTRACT

A lighting system and a method of operating the lighting system are described. A plurality of lighting units (10, 10') each comprise, a lighting element (12) with a lighting control unit (14) for controlling its light output, and a communication unit (16, 16') for communicating over a communication medium, e.g. RF or power line communication. The units (10, 10') further have an optical receiver (18) for receiving light from other lighting units (10, 10'). A controller unit (20) is connected to the optical receiver (18), the communication unit (16, 16') and the lighting control unit (14). In order to allow easy, automated set-up, at least in a configuration phase, the lighting units (10, 10') send information by operating the lighting elements (12) in a modulated manner, and this information is received by a further lighting unit (10, 10') observing the generated light. According to a first aspect, the lighting units (10, 10') are grouped in clusters by turning on the lighting element (12) in a first lighting unit and generating cluster information depending on whether or not the emitted light is observed by further lighting units. According to a second aspect, lighting units (10, 10') form a communications network and communicate with a joining lighting unit (66) by transmitting code data (78*a*, 78*b*) by operating the lighting element (12) according to a modulation sequence, and then transmitting configuration data (80) over the communication medium encrypted with the code data (78*a*, 78*b*).

8 Claims, 4 Drawing Sheets

U.S. PATENT DOCUMENTS

| | | | | |
|---|---|---|---|---|
| 6,548,967 | B1 | 4/2003 | Dowling et al. | |
| 7,309,985 | B2 | 12/2007 | Eggers et al. | |
| 2005/0169643 | A1 * | 8/2005 | Franklin | 398/187 |
| 2005/0231128 | A1 | 10/2005 | Franklin | |
| 2006/0239689 | A1 | 10/2006 | Ashdown | |

FOREIGN PATENT DOCUMENTS

| | | |
|---|---|---|
| WO | 2004023849 | 3/2004 |
| WO | 2005096677 | 10/2005 |

OTHER PUBLICATIONS

S. M. Bellovin and M. Merritt, "Encrypted Key Exchange: Password-Based Protocols Secure Against Dictionary Attacks", Proceedings of the I.E.E.E. Symposium on Research in Security and Privacy, Oakland, May 1992.

* cited by examiner

LIGHTING SYSTEM WITH LIGHTING UNITS USING OPTICAL COMMUNICATION

The invention relates to a lighting system, a lighting unit for use in a lighting system and a method of controlling a lighting system.

A lighting system in the present context is understood to mean a system comprising a plurality of lighting units, which are connected such that they can be appropriately controlled. Such a lighting system may be installed in a building and may comprise, additionally to installed lighting units (lamps) also other elements, such as control elements (e.g. switches, sensors, advanced controllers) and the like.

WO-A-2005/096677 describes a lighting system, which may be used in offices and conference rooms. There are lighting units (lamps) installed in a room in known spatial positions. Each lighting unit comprises a wire connection or wireless connection to communicate with a controller unit. The controller unit is programmed to run an automatic commissioning process. Firstly, all lighting units are turned off, then an "on"-command is communicated to a first one of the lighting units to turn on this lighting unit. The controller comprises a light measuring cell, by which it receives the light emitted from the lighting units. The spatial position of the lighting units is deduced from the perceived light direction and the perceived intensity level or light intensity changes. In this way, a lighting system within a building with several rooms may be configured, in which a controller unit is installed in each room.

However, setting up a lighting system still requires some configuration steps that are not automated in the current systems. This is especially true for a lighting system where communication needs to be secured by encryption, which requires the encryption key to be made available to each lighting unit in a secure manner.

It is therefore an object of the present invention to provide a lighting system, a lighting unit and a method of controlling a lighting system, which allows easy and automatic reconfiguration.

Accordingly, the present invention provides a lighting system, comprising a plurality of lighting units (10, 10'), each lighting unit comprising a lighting element (12) for generating light, a lighting control unit (14) for controlling the light output of said lighting element (12), a communication unit (16, 16') for sending and receiving communication signals over a communication medium, an optical receiver (18) for receiving the light from other lighting units (10, 10'), and a controller unit (20) connected to said optical receiver (18), communication unit (16, 16'), and lighting control unit (14).

The invention also relates to a lighting unit for use in a system according to one of claims 1-3, said lighting unit comprising a lighting element (12) for generating light, a lighting control unit (14) for controlling the output of said lighting element (12), a communication unit (16, 16') for sending and receiving communication signals over a communication medium, an optical receiver (18) for receiving light from other lighting units, and a controller unit (20) connected to said optical receiver (18), communication unit (16, 16'), and lighting control unit (14).

The invention also relates to a control element for use in a lighting system said element comprising a function element (24) for performing a switching, controlling or sensor function, a communication unit (16, 16') for sending and receiving communication signals over a communication medium and a lighting element (12) for generating light and a lighting control unit (14) for controlling the output of said lighting element (12), and/or an optical receiver (18) for receiving light, and a controller unit (20) connected to said function element (24), optical receiver (18), communication unit (16, 16'), and lighting control unit (14).

Furthermore the invention relates to a method of controlling a lighting system, said lighting system comprising a plurality of lighting units (10, 10'), each of said lighting units comprising a lighting element (12) for generating light, a communication unit (16, 16') for communicating over a communication medium, and an optical receiver (18) for receiving light from other lighting units (10, 10'), where said lighting units (10, 10') communicate over said communication medium, and where, at least in one configuration phase, at least one of said lighting units (10, 10') sends information by operating said lighting element (12) in a controlled manner, and at least one further lighting unit (10, 10') receives said information by observing said generated light.

A lighting system according to the invention comprises a plurality of lighting units. The lighting units have a lighting element for generating light, and an associated lighting control unit which controls the light output of the lighting element. Further, there is a communication unit for sending and receiving communication signals over a communication medium, which is preferably a shared medium and may be a standard communication medium, such as e.g. IEEE802.15.4 radio communication or power line. An optical receiver is present to receive light from other lighting units. A controller unit is connected to the optical receiver, the communication unit and the lighting control unit.

As will become apparent, such a lighting unit and a lighting system comprised of a plurality of such lighting units may easily be configured due to its ability to

- control its own light output, and
- receive light from other lighting units
- while communicating over the communication medium to achieve control and/or alignment.

In this way, an additional communication channel (optical link) is established, which allows to send and receive data between the lighting units. With the transfer of this data over this optical link in addition to the communication over the communication medium, easy and automated establishment (bootstrapping) of secure communication becomes possible. Because in most cases the bandwidth of the optical link will be less than that of the communication medium, it is preferred to use the communication medium for most transmissions, and only transmit complementary information over the optical link.

The communication over the communication medium is preferably used to achieve alignment of communication over the additional optical link between the lighting units. The term "alignment" is understood to mean any type of time correlation of the optical communication between the lighting units (i.e. which lighting unit sends and/or receives optical signals at what time and/or of what duration), especially ordering (i.e. in what order lighting units send and/or receive optical signals). Thus, alignment allows a lighting unit receiving an optical signal to interpret this information appropriately.

The lighting element may comprise any type of light emitting element, such as incandescent lamps, gas discharge lamps, fluorescent lamps, LEDs and the like. There may be one or more of these light emitting elements present, which may produce light of the same or different color. The light output of this lighting element is controlled by the lighting control unit, which may comprise simply turning the lighting element on or off as well as more sophisticated types of modulation such as varying the luminous flux or color or duration or another parameter in a continuous or discrete manner.

The communication unit communicates over a communication medium. This comprises types of communication which are not limited to line-of-sight (as light is) and which allow for bi-directional communication, such as e.g. radio (RF) communication or power-line communication. There are many different protocols known today according to which such communication may be organized. It is not necessary for every lighting unit to be able to physically receive signals emitted from every other lighting unit directly (one-hop), if the protocol provides for forwarding of transmissions (multi-hop) between nodes. As will further be explained below, one preferred embodiment is to use an RF interface according to the "ZigBee" network stack on top of IEEE 802.15.4.

The optical receiver may be any type of element that has the ability to receive the light emitted from the lighting elements of other lighting units. It is possible, for example, to just use a simple photodiode to detect the presence or absence of any incident light by means of a threshold discriminator. Alternatively, it is also possible to employ other types of light-sensitive elements. There may be more than one light-sensitive element present in the optical receiver, e.g. one for each direction from which light could be received. Further modifications to the receiver are possible, so that it e.g. could be selective to a specific bandwidth of incident light or that it can react to light changes with respect to any kind of background illumination (e.g. through sunlight or other artificial light).

Finally, the controller unit may be any type of processing unit able to at least receive signals from the optical receiver, send control commands to the lighting control unit and send/receive commands over the communication unit. It is possible to send very little onboard intelligence to the lighting units by providing a controller unit which only acts as an interface, forwarding incoming signals from the optical receiver over the communication unit, and controlling the lighting control unit in response to a command received via the communication unit. Alternatively, it is also possible to use a microcontroller with sufficient memory and a programming that implements the behavior of the lighting unit locally, as will become apparent in connection with the description of the preferred embodiment.

The lighting system may be installed in a building. A lighting system need not be limited to only the lighting units, but may comprise further elements such as control elements (switches, dimmers or complex control units, such as e.g. PCs, sensor elements and the like).

A control element according to the invention comprises a communication unit which enables the control element to communicate over the communication medium. Further, the control element comprises a function element. It is this element that enables the control element to perform its special control function. The function element may be or comprise one or more of a switching element, a control element (e.g. a microprocessor), or a sensor element for sensing a sensor value.

The control element further comprises either a lighting element for generating light, which is associated with a lighting control unit for controlling its output, or an optical receiver for receiving light emitted from lighting units or other control elements, or both a lighting element and an optical receiver. A controller unit of the control element is connected to the function element, optical receiver (if present), and lighting control unit (if present). The controller unit operates the functional elements of the control element. It enables the control element to perform switching, controlling or sensor functions within the network, communicating output of its function element over the communication medium.

It should be noted that a control element having both a lighting element and an optical receiver has all features of a lighting unit (plus the additional function element). Thus, such a control element may be seen as a (special) type of lighting unit, so that all explanations described above and below with respect to lighting units may also apply to such control elements.

Clustering of Lighting Units

In a first preferred embodiment of the invention, the lighting units are, during a configuration step, grouped into one or more clusters. Specifically, if the lighting system is installed in a building with a plurality of rooms, the lighting units should be grouped such that all lighting units in the same cluster are located within the same room, and vice versa, such that control of a whole cluster is possible from a single control point (e.g. switch). These clusters reflect the ability of lighting units to observe the light emitted from other lighting units. This may be achieved by (preferably after first turning off all lighting elements):

turning on the lighting element of a first lighting unit, and generating cluster information depending on which lighting units observes the light emitted from the lighting element of the first lighting unit.

In this way, it is possible to automatically generate cluster information according to the topology of the installation of the lighting units. Preferably, the steps are repeated for a plurality of lighting units, where each time a different lighting unit is turned on. It is further preferred, but not absolutely necessary, to repeat the steps for all lighting units in the system.

The operation during clustering may be controlled, and/or the clustering information stored in a decentralized manner (i.e. in a plurality of lighting units) or in a centralized manner (i.e. in one central device).

If the clustering is performed in a centralized manner, the central device may be a central unit with a communication unit. The central unit sends commands via the communication medium to trigger the steps described. At least one, but preferably all lighting units which observe the light emitted from the first lighting unit report this to the central unit as detected information, i.e. whether light was observed or not. The central unit processes the detected information to generate and store cluster lists.

If the clustering is performed in a decentralized manner, the lighting units themselves organize the operation according to the steps described above. To achieve alignment, they may communicate over the communication medium. The cluster information generated may be stored as a cluster table in a storage means that is part of one or more lighting units. For effective decentralized operation, it is preferred that all lighting units comprise storage means for a cluster table. It should be noted, however, that the cluster information available to one unit need not be complete, i.e. describe the clustering of all lighting units in the system. Instead, it is preferred to be limited to the cluster information relevant to the individual lighting units, e.g. a list of identifiers for all lighting units in the same cluster.

Secure Network Configuration

In a further preferred embodiment, the additional optical communications channel is used to automatically, yet securely, setup (bootstrap) secure communication.

In order to secure communication over a shared medium, e.g. by encryption, the related security mechanisms need to be bootstrapped, which in particular means that a first ("initial") secret is to be established (e.g. to be used directly as a key, or for authentication of further cryptographic message exchange).

Whereas after installation of lighting units it is not easy to predict the bounds of the communication range over the shared medium (which is not limited to one room, or even one building), the characteristics of light propagation generally limit the optical communication to a single room within a building.

For the purposes of security bootstrapping, devices proven to be within the same room during the configuration phase may safely be assumed to be authenticated. These characteristics are employed by transmitting code data (e.g. comprising the initial secret), used for security bootstrapping over the optical communication link available to the lighting unit. In this way, only devices in the same room are authenticated, and devices within network communication range, but outside of the room, are not.

Configuration starts by assuming that a part of the network is already configured. It should be noted that in a broad sense even a single lighting unit may be regarded as a network, although the network will generally comprise a plurality of lighting units (nodes). Thus, the same mechanism is applicable for establishing the network between (a) first (pair) of nodes. The lighting units (and possibly other types of nodes, e.g. control units) in the network are configured to communicate over the communication medium.

In order to allow a (e.g. newly installed) lighting unit to join the network, code data is sent over the optical link. The code data is used in bootstrapping security (e.g. as initial secret), and may be used e.g. as a key for symmetrical encryption, a key pair for asymmetrical encryption, a part of a symmetrical or asymmetrical key, a part of data out of which a part or a complete symmetrical or asymmetrical key may be calculated in a lighting unit. For example, the code data can be used for authentication of an cryptographic message exchange (e.g. Diffie-Hellman).

Code data is transmitted from the joining lighting unit to at least one lighting unit already configured in the network (network node), or from a network node to the joining lighting unit, or both, by encoding the code data "in light" in the simplest case by the duration of a lighting unit "on" period and controlling the lighting element according to this. More generally, the encoding is done by a "modulation sequence" (to be understood in a broad sense) that may comprise any type of change of lighting parameters (intensity, color etc.) over time. Preferably, the sequence relates to the luminous flux, which changes over time. As a simple example, on/off keying may be used.

Advanced light sources (e.g. LEDs) may be capable of using advanced light modulation features to transfer information. They may produce complex time-variant lighting patterns by changing other parameters of the light, e.g. light intensity or frequency or duration or any combination thereof. This will of course require appropriate optical receiver, capable of measuring the modulated parameter. With increasing complexity of the lighting element and the optical receiver, it is easier to carry higher amounts of information over optical link.

In a preferred embodiment, one of the network nodes already configured is selected for the role of registrar. As the range and propagation of the communication over the shared medium will generally differ from the range and propagation over the optical link, not all of the network nodes may be able to communicate with the joining lighting unit over the optical link. Thus, a configured lighting unit in the line-of-sight of the joining lighting unit is chosen as registrar. This is achieved by the joining lighting unit, already announced over the communication medium, sending a detection signal over the optical link (i.e. modulating the operation of its lighting element). If a network node receives the detection signal, this indicates that optical communication between this node and the joining lighting unit is possible. The node may thus be chosen as registrar, so that, consequently, the code data is exchanged between the registrar and the joining lighting unit. If more than one network node receives the detection signal, the registrar is chosen among them. This may be achieved by communication within the network (standard communication medium).

It is preferred that the exchange of code data between the joining lighting unit and a network node is bi-directional. The code data may then comprise a first code, which is transmitted from the joining lighting unit to the network node, and a second code, which is transmitted from the network node to the joining lighting unit. The first and the second code data may be e.g. X-ORed, concatenated, hashed one with the other etc. to build an (at least temporary) initial shared secret, securely established via the optical link. In a preferred embodiment, this data element is used to password-authenticate the Diffie-Hellman key exchange protocol (or any other asymmetric key protocol), executed between registrar and joining node—for better performance—over the communication medium. The said data element may also directly be used for establishing a secure key hierarchy, e.g. as ZigBee Trust Centre Master Key.

These and other aspects, features and/or advantages of the invention will be apparent from and elucidated with reference to the embodiments described hereinafter.

BRIEF DESCRIPTION OF THE DRAWINGS

Preferred embodiments of the invention will now be described in details with reference to the drawings, in which.

DESCRIPTION OF PREFERRED EMBODIMENTS

Figure 1:
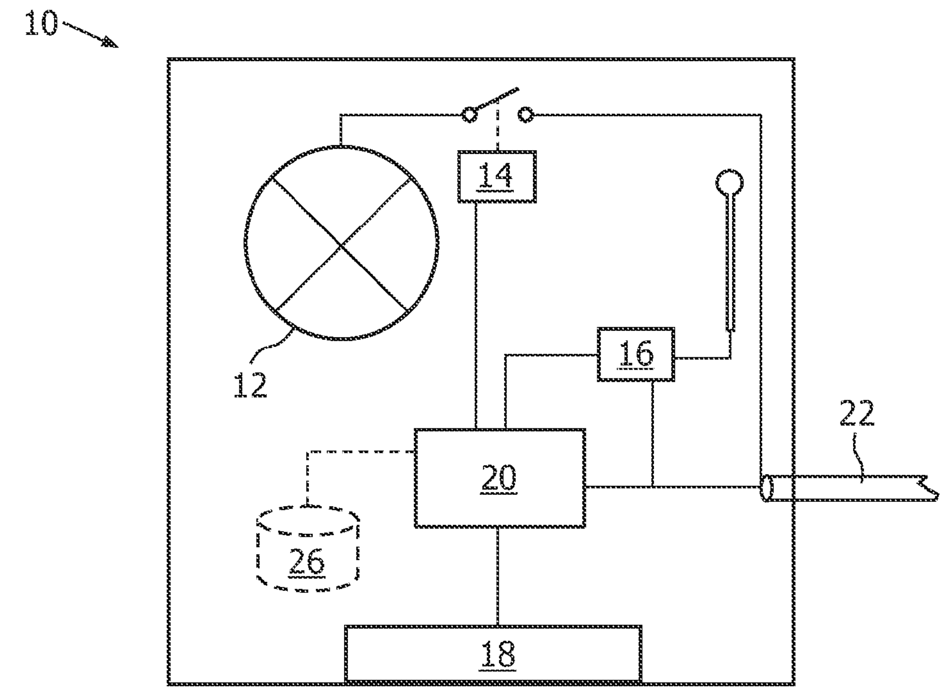
FIG. 1 shows a schematic drawing of a first embodiment of a lighting unit with an RF communication unit.

FIG. 1 shows as a schematic representation a first embodiment of a lighting unit 10. The lighting unit 10 comprises a lighting element 12, which, as explained above, may be any type of lighting element. In the present example, the lighting element 12 is a halogen lamp to be used for illuminating a room. A lighting control unit 14 is provided to control the luminous flux from lighting element 12 by turning the lighting element on or off and/or dim it. A communication unit 16 is provided as an RF communication interface, in the present example a ZigBee network stack on top of IEEE 802.15.4 for RF communication and control. In this example, RF communication is used as the standard communication medium. An optical receiver 18 is present, which in the present example comprises a plurality of photodiodes. The lighting control unit 14, the communication unit 16 and the optical receiver 18 are connected to a controller unit 20 which is a microcontroller running a locally stored operating program. A power supply 22 is connected to all units and elements of the lighting unit. As will be explained, optionally a storage/memory unit 26 may be present.

The lighting unit 10 may communicate over the RF interface 16 with other lighting units of the same type, as well as with other devices (e.g. sensors, switches, controllers) including a ZigBee/IEEE 802.15.4 interface. A plurality of lighting units of the type shown in FIG. 1 may be configured to form a network, where communication over the standard communication medium (RF) is organized according to the ZigBee/IEEE 802.15.4 protocol, including addressing, medium access, collision detection etc. as well as forwarding of received network messages, which are directed to other nodes (multi-hop communication). In the RF network, the network nodes are uniquely and uniformly addressable. These unique addresses may be physically hard-coded in the RF communication unit 16 (as the MAC address in IEEE 802.11) or they might be logical addresses, assigned while joining the network (as e.g. the short IDs in ZigBee).

Figure 2:
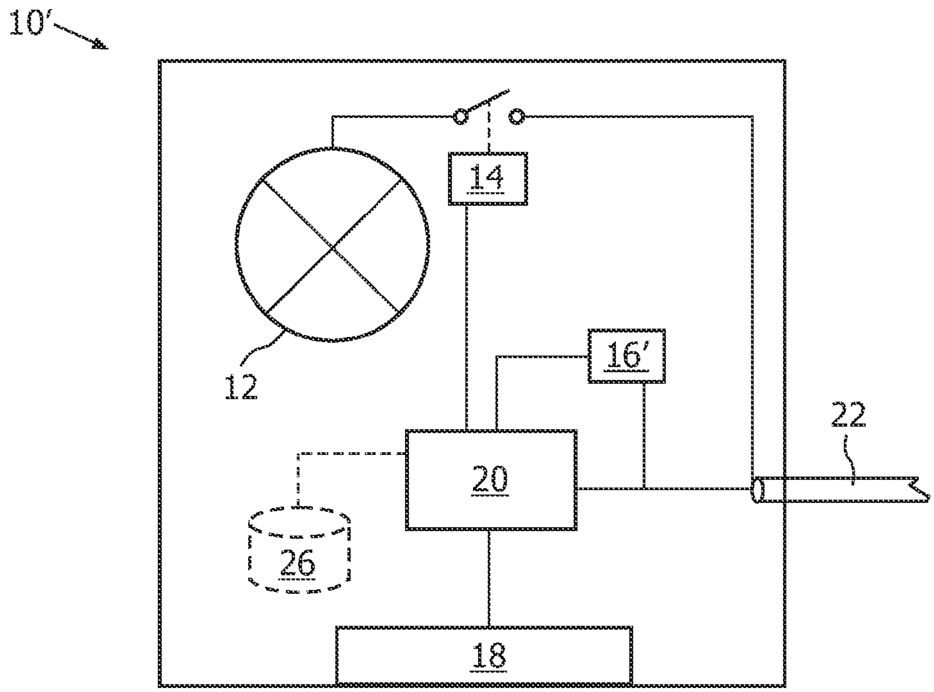
FIG. 2 shows a schematic drawing of a second embodiment of a lighting unit with a power-line communication unit.

FIG. 2 shows a second embodiment of a lighting unit 10', which is identical to lighting unit 10 of FIG. 1 in all aspects except for the communication unit 16', which in the second embodiment is a power-line communication unit. A network of lighting units 10' (and other nodes) communicates over signals modulated on the mains connection 22. In this example, powerline communication serves as the standard communication medium. Here, again, it is assumed that the communication over the standard communication medium is organized with respect to addressing, networking, medium access, etc.

Lighting System

Figure 3:
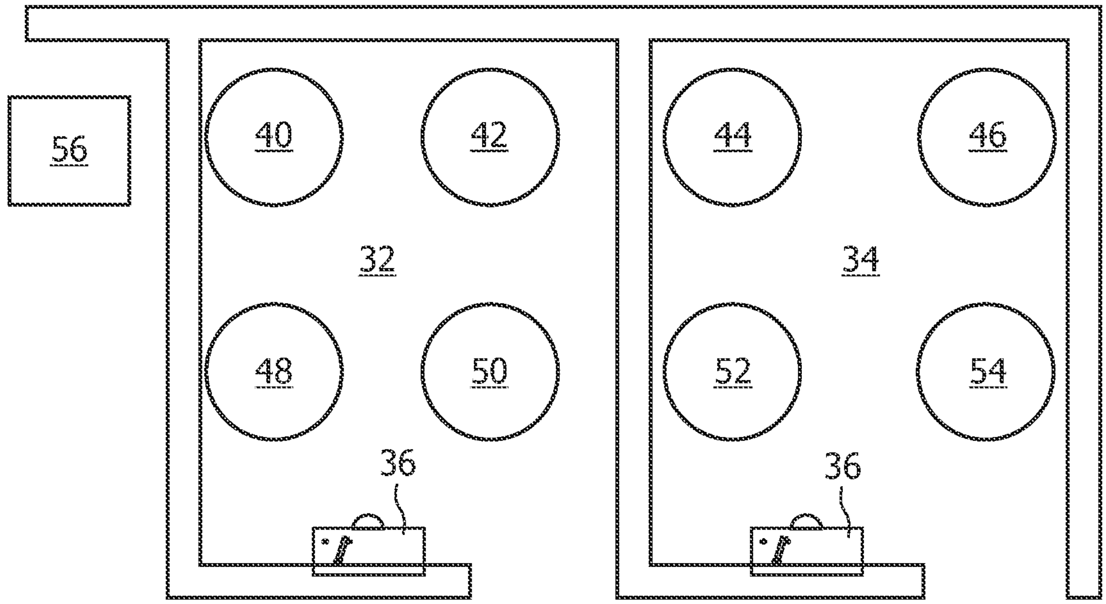
FIG. 3 shows a symbolical representation of an embodiment of a lighting system with lighting units installed in a building.

FIG. 3 shows a symbolic representation of a part of a building 30 with two rooms 32, 34. In the building 30, a lighting system is installed which comprises lighting units 40, 42, 44, 46, 48, 50, 52, 54 as well as switches 36, 38 (and a central unit 56 which will be explained later). The lighting units 40-54 are RF-controlled lighting units as described above in connection with FIG. 1. They are installed in the ceiling of rooms 32, 34, where their lighting elements 12 serve as room lighting.

Figure 4:
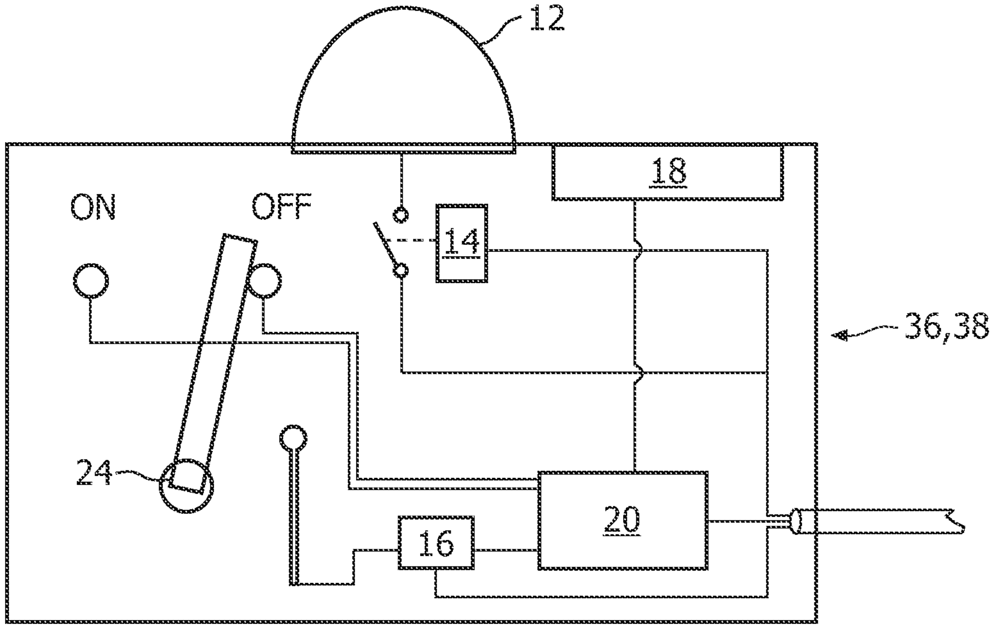
FIG. 4 shows a schematic drawing of a switch unit.

The switches 36, 38 are shown in FIG. 4 in a schematic representation. To perform their function as control elements, an outside accessible switch 24 is provided. The switching state (on/off) is read out by the controller unit 20. For communication over the standard communication medium, they comprise RF communication unit 16. Further, the switches 36, 38 comprise the same elements as the lighting units 10, i.e. a lighting element 12 (which in the case of the switches 36, 38 is only one LED), lighting control unit 14, RF communication unit 16, optical receiver 18 and controller unit 20.

It should be noted that although the example of FIG. 4 shows both a lighting element 12 and an optical receiver 18, it is alternatively possible that only one of these two elements is present.

Figure 5:
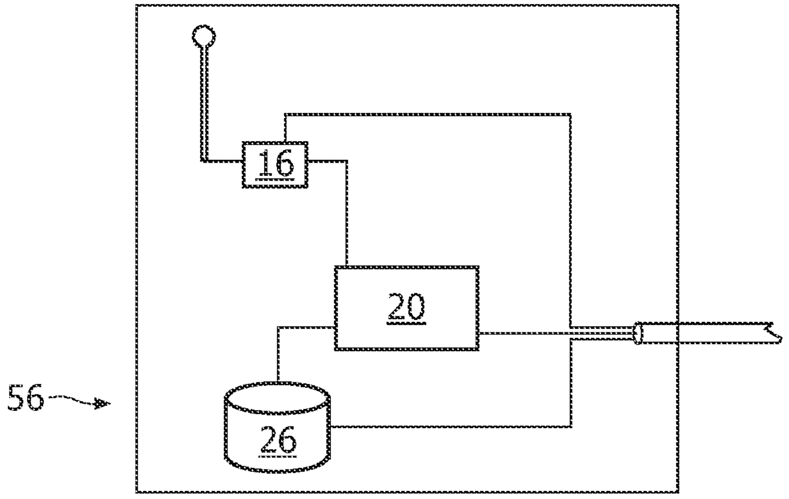
FIG. 5 shows a schematic drawing of a central unit.

In the building 30, there is further present a central unit 56. FIG. 5 shows a schematic representation of central unit 56, which comprises some of the elements already described above in connection with the lighting unit 10: an RF communication unit 16 and a controller unit 20. Central unit 56 further comprises a storage unit 26 for storing a cluster table. Storage unit 26 may be any type of permanent or volatile storage which may be accessed (read/write) by microcontroller 20. This central unit 56 is to be understood as a logical entity, consisting of the above-mentioned elements. Its physical implementation should not be limited, i.e. the central unit 56 could be e.g. a PC (with storage and controller), connected via some communication medium (e.g. longer range technology, as e.g. Ethernet, 802.11, Internet) with a gateway node, translating the transmitted information into the communication medium used by the lighting units' 40-54 communication modules 18 (e.g. ZigBee/IEEE802.15.4).

In operation, the lighting system provides the room lighting for rooms 32, 34. The lighting units 40-54 are organized in a network, where control commands are communicated over the RF link. This includes switching commands, e.g. issued from switch 36 to all lighting units in room 32. Responsive to these control commands, the lighting units are operated, i.e. the lighting elements 12 are turned on or off in response to the switching state of switching elements 24 of switches 36, 38.

In order to provide this functionality, it is necessary to provide complete installation and configuration of the lighting system. In the following, it will be explained how configuration may be automated.

Automatic Clustering

A first aspect is an automatic clustering mechanism. The target of the proposed clustering mechanism is to achieve a sub-network topology of an overall lighting network, which precisely mirrors the architectural topology of the lighting units' environment (building 30). The protocol relies on two communication modes: RF communication and optical communication.

The network nodes, i.e. lighting units 40-54 and switches 36, 38, can find all their "neighbor nodes" independently of their "logical proximity" (e.g. being in the same room), by means of the (standardized) discovery and auto-configuration features of the RF communication technology in use, as in the present example ZigBee (IEEE 802.15.4). The optical communication allows for limiting the list of "neighbor nodes" to only those that are optically visible, i.e. those placed in the same room (not hidden behind walls or ceilings). Even if lighting units are mounted in shelves, in hidden ceilings or other locations where they cannot be directly "seen", some light flux from such units can be observed somewhere in the room, e.g. via wall reflections, and by suitable choice of the optical receiver 18 can be observed by other lighting units.

As explained, the network nodes comprise not only lighting units 40-54 with relatively powerful lighting elements 12 serving as room lighting in the building 30, but switches 36, 38 are also network nodes and also comprise an (auxiliary) lighting element, which may in normal operation be used e.g. for status control or to easily find the switch in the darkness. This lighting element, together with the optical receiver 18, is used in the clustering phase to assign the switches 36, 38 to the correct cluster, so that in subsequent operation e.g. the switches determine operation of all lighting units in the same room, but not in the other room. Alternatively, the switches could only be equipped with optical receiver 18, but not lighting element 12, to receive the optical communication from the lighting units 40-54. Alternatively, the switches could only be equipped with lighting element 12, but not an optical receiver 18, to send the optical signal to be received by the lighting units 40-54. The capabilities of the control element with respect to optical communication (sending or receiving or both) would require a corresponding adaptation of the procedures, as outlined below under "possible variants".

First Embodiment of an Automatic Clustering Algorithm

Central Coordination

In the first embodiment, central unit 56 is a node in the lighting system network. Central unit 56 is equipped with a controller unit 20 that may perform more complex calculations than the controller units 20 in the lighting units 40-54 or switches 36, 38, which in this embodiment may be very simple. Central unit 56 also comprises storage means 26 for maintaining a list of all network nodes and for storing the cluster list.

It is assumed, that each of the network nodes knows the address of (and, in multi-hop networks, at least the beginning of the route to) the central unit 56. We further assume that the central unit 56 knows the address space to be searched, i.e. it has the complete list of all nodes associated via the RF network (with their MAC addresses or other serial numbers), and/or it knows the logical address space to be used (e.g. those defined by the ZigBee tree addressing parameters). This can easily be fulfilled if the central unit 56 role is combined with the ZigBee PAN-Coordinator role.

The central unit 56 controls the commissioning mechanism as follows:

0. Central unit 56 triggers the clustering procedure by sending a network-wide "prepare for clustering" message (e.g. to turn all lights off and tell them to ignore input from other control devices for the execution time of the clustering procedure). The central unit can be triggered automatically or by user interaction.

One by one, the central unit 56 selects each network node "i" and sends a clustering message via the RF link to it with the semantics: >"i", introduce yourself<, where "i" runs between all identifiers of lighting units 40-54 as well as switches 36, 38.

After receiving this clustering message, the node "i":

Via the RF link, broadcasts (with limited broadcast range) the >hello "i"< message containing its address/identifier, For the purpose of optical signaling, switches on its lighting element 12 for a predefined period of time ("optical on period").

After receiving the >hello "i"< message each node "n" checks, if it also detects the light emitted by node 'i' using its optical sensor: If the light is detected, node 'n' sends a unicast "hello response" message with node "i" and node "n" addresses) to the central unit 56. If the light is not detected, no message is sent.

When receiving "hello response" message(s), the central unit 56 adds the address of each node "n" to the list of cluster-mates of node "i". Optionally, the central unit 56 can remove each node "n" from the list of nodes to be introduced/clustered (as already belonging to the cluster of node "i"), thus shortening the list of nodes still to be introduced/clustered, i.e. reducing the amount of traffic and the time needed to execute the clustering procedure. Alternatively, the central unit 56 can add the node "i" to the list of cluster-mates of each node "n". Furthermore, the central unit 56 can fill the cluster mate table entries of node "i" as well as each of the node "n" in "hello response" message(s). This has two advantages: on the one hand, lists are filled with fewer operations (and thus less traffic), and on the other hand situations where the optical link between two nodes exists only in one direction, their topological association can still take place.

The procedure is repeated for any next node in the list of nodes to be introduced, until all nodes are assigned to a cluster.

The central unit 56 assigns a unique identifier to each cluster, e.g. assigns the group address to it; it might be e.g. MAC, NKW or application layer multicast/group address or cluster identifier carried in an independent header field. Then, it informs each node in this cluster about the assigned name.

This can be done by, addressing each node in a unicast or a broadcast message (payload list all nodes belonging to a given cluster together with the cluster identifier). Each of the nodes stores the cluster identifier, optionally it also updates the list of cluster mates.

Example According to the First Embodiment

In the scenario shown in FIG. 3, the clustering algorithm—after "prepare for clustering" message—is initiated by central unit 56 by first sending a clustering message (over RF) to lighting unit 40, which in turn broadcasts a >hello "40"< message (over RF) (containing the lighting unit's identifier "40") and turns on its lighting element 12. The light is observed only by network nodes in the same room 32, i.e. nodes 42, 48, 50, 36.

All nodes 40-54 and 36, 38 have received the >hello "40"< broadcast message. But only those that observe the light report back to the central unit 56. From these reports the central unit 56 generates the first lighting unit's cluster list and assigns a cluster identifier:

CLUSTER #1
Node "40"
Node "42"
Node "48"
Node "50"
Node "36"

The central unit 56 then selects the next node to be addressed. While it could simply select the next available node, it will skip nodes already clustered (i.e. those contained in the cluster list of cluster #1) and address node 44. Again, node 44 is triggered to communication over RF and turn its lighting element on and the reports from all nodes in room 34 will yield a second cluster list:

CLUSTER #2
Node "44"
Node "46"
Node "52"
Node "54"
Node "38"

The central unit 56 sends a broadcast RF message with both cluster lists, so that all nodes are informed, part of which cluster they are and can store this information.

This simple example shows how, without any prior knowledge of the topology and arrangement of network nodes, complete clustering information could be automatically generated.

Possible Variants of the First Embodiment

There are many possible alternative ways and extensions as to how the clustering algorithm according to the first embodiment may be implemented:

The "optical on period" can start during, immediately after or some time after the >hello "i"< message sent over the standard communication medium. E.g. for simultaneous RF and optical communication, the duration of the "optical on period", i.e. the minimum period of time that the lighting units should be turned on to be properly detected by all network nodes in sight may be calculated as "optical on period"=(2*r)*RTT, where r equals the "radio broadcast range"=number of broadcast hops, and RTT denotes the radio roundtrip time per hop.

It may be advantageous if the central unit 56 consolidates the cluster list. It may happen, that not all nodes in one cluster were directly visible to all other nodes or e.g. the broadcast range was too small, and could not reach every node in one cluster or due to complex room structure (e.g. L-shaped). Also, there may be several entries for (parts of) the same cluster. Therefore, an algorithm may be advantageous, that will find the parts of the same cluster (should share some nodes in the "cluster mates list") and merge the connected sub-clusters into one cluster. Such an algorithm may be implemented straightforward.

In the above step 3, instead of responding to the central unit 56, all of the nodes "n" could respond to node "i", and node "i" could then forward a list of its "cluster mates" to the central unit 56. This will reduce the amount of the long-distance (i.e. multi-hop) traffic to the central unit 56.

Depending on the optical communication capabilities of the control nodes (e.g. sensors, actuators, controllers, computers, etc.), their assignment to clusters may be done by the central unit 56 solely based on their "hello response" messages to the received optical signals (if no lighting element 12 is available) or, alternatively, on response of lighting units to their >hello "i"< messages (if no optical receiver 18 is available). To adapt the procedure accordingly, the optical communication capabilities of these control nodes must be known at least to the central unit 56.

Second Embodiment of an Automatic Clustering Algorithm Distributed Coordination Contrary to the first embodiment, there is no central unit present. Instead, each network node maintains its own cluster table, consisting of the cluster identifier and the list of cluster mates. Each network node comprises a cluster table storage 26 (as shown in FIG. 1, FIG. 2).

We assume that some MAC protocol is used, e.g. using a beacon signal etc. At the beginning, the cluster table is empty and the cluster identifier is not set.

Clustering is automatically effected in the following steps:

A first network node (lighting unit or switch) triggers the clustering procedure by sending a network-wide "prepare for clustering" message (e.g. to turn all lights off and tell them to ignore input from other control devices for the execution time of the clustering procedure). This first lighting unit can be e.g. the PAN coordinator, or the lighting unit triggered by the user, or just any other arbitrarily chosen node; triggered automatically or by user interaction.

The first network node then sends the following information as limited-range broadcast clustering message over the RF link:

Selected cluster identifier (this can be a random number, a consecutive number or derived from a node's own identifier; in the latter case, at least 1 bit of information in the node's address is needed to distinguish between individual and cluster addresses);

The lighting unit's own identifier (if it is not available from underlying protocol layers);

The identifier of the designated successor in the protocol, i.e. the next node to introduce itself. The successor node is selected among not previously clustered radio neighbors of the sending node. If no successor node can be designated, the message is just sent without or with a broadcast address in the successor field and the neighbors will try to access the medium according to the underlying MAC rules (e.g. with random back-off delay, assuming that any collisions are detectable on the MAC).

While (or shortly after) sending the above-defined clustering message, this first node uses optical signaling, i.e. it turns on its lighting element 12 for a predefined "optical on period" duration.

All of the nodes check input on both RF and optical receivers. Their operation depends on the signals received over the RF or optical link:

The nodes, which receive both the radio clustering message and the optical signal, store the cluster identifier from the clustering message as "their" cluster identifier and store the identifier of the sender/node introducing itself in "their" cluster table.

The nodes, which receive only the radio clustering message (and no optical signal), store the identifier of the sender/node introducing itself as not belonging to "their" cluster (e.g. in another list, a 'non-mates list', or mark it as already seen and belonging to a different cluster), in order to avoid addressing it in the future.

The node (lighting unit or switch) designated as successor creates the next clustering message and sends as limited-range broadcast, with the content dependent on whether it received the optical signal, and also on whether it is already part of a cluster:

If the designated successor node could receive both the radio and the optical signal from the predecessor node, its clustering message contains the same cluster ID, its own identifier and a successor node selected from among its neighbors. The algorithm to select the successor should prevent selecting nodes, which already communicated in the clustering procedure (i.e. those already listed in "own" cluster table or non-mates list).

If the designated successor node did not receive the optical signal of the predecessor node, and if it does not belong to any cluster yet (i.e. neither received any other optical signal yet nor went through the clustering procedure), its clustering message contains a new cluster ID, its own identifier and a successor from among its (not yet clustered) neighbors.

If the designated successor node did not receive the optical signal of the predecessor node and already belongs to some cluster (i.e. it previously received some clustering message with concurrent optical signaling), its clustering message contains the cluster ID of the cluster it already belongs to, its own identifier and a successor from among its (not yet clustered) neighbors.

Then, it also turns its lighting unit on.

It should be noted that alternatives b) and c) refer to the case where the successor is not part of the same cluster (because it did not receive the optical signal). Alternatively to continuing as described above in steps b) and c), the choice of successor could be repeated to try to find a successor within the same cluster. To achieve this, the node that was selected as successor but did not receive the optical signal, should respond via the RF link in unicast to the predecessor node (or just remain silent), so that the predecessor node can detect from this kind of "negative acknowledgement" the cluster boundary, and send the clustering message anew with a changed successor. This will allow for first finding all nodes belonging to one cluster; for the next cluster, the procedure will be automatically re-triggered as described in steps 4 and 5 below. If this implementation option is used, the timeout for re-triggering may be shortened, i.e. adapted to the expected number of nodes per cluster (e.g. 20-50).

Error handling: nodes, which after a timeout (of e.g. n*"optical on period"+additional random back-off delay to avoid collisions; where n may be default or network-size dependent) still have not been contacted at all (have neither received any clustering messages via the RF link nor observed any optical signaling), send the clustering message with the following parameters:

cluster ID=not selected (e.g. broadcast or zero) (optionally its own ID)

successor ID=not selected (e.g. broadcast or zero), accompanied by optical signal transmission as described above.

Each (already clustered) network node, which receives both the optical and the radio signal, shall answer with a transmission over the RF link containing the cluster ID and the successor ID set to the ID of the triggering node. If the newly clustered node has still some not yet clustered neighbors, it may continue with the clustering procedure, proceeding as in step 1.

Other yet not clustered nodes, which receive such new clustering message, should wait for the response clustering message and, subsequently (if no new clustering message will follow), wait for a predetermined time-out before proceeding as in step 4.

If there is no response to the clustering message described in step 4 within a predetermined timeout (e.g. 5 clustering slots), the triggering node should select a new cluster identifier and proceed as in step 1.

Example According to the Second Embodiment

In the scenario as shown in FIG. 3 (but without central unit 56), let us assume that network node 50 triggers the clustering procedure. It sends the following clustering message over the RF link Clustering Message [cluster #1, node "50", successor node "48"]

and simultaneously turns on its lighting element 12 for the "optical on period". Since lighting unit 50 is installed in room 32, the light is observed only by network nodes in the same room 32, i.e. nodes 40, 42, 48 and 36. Consequently, these nodes store the following cluster information:

CLUSTER INFORMATION OF NODES 40, 42, 48, 36

Cluster identifier #1

Node 50

The nodes which received only the RF message but not the optical signaling add cluster 50 to their non-mates-list:

NON-MATES-LIST OF NODES 44, 46, 52, 54, 38

Node 50

Then, the designated successor continues clustering by sending a Clustering Message [cluster #1, node "48", successor node "42"] and turning on its lighting unit 12. This leads to the following list entries:

CLUSTER INFORMATION OF NODES 40, 42, 48, 50, 36

Cluster identifier #1

Node 50

Node 48

NON-MATES-LIST OF NODES 44, 46, 52, 54, 38

Node 50

Node 48

This is continued until all network nodes have been addressed and no further successor can be chosen, finally yielding the following cluster lists:

CLUSTER INFORMATION OF NODES 40, 42, 48, 50, 36

Cluster identifier #1

Node 50

Node 48

Node 40

Node 42

Node 36

CLUSTER INFORMATION OF NODES 44, 46, 52, 54, 38

Cluster identifier #2

Node 52

Node 44

Node 38

Node 46

Node 54

Possible Variants for Both Embodiments of Automatic Clustering

There are also some alternative ways and extensions as to how the clustering algorithm according to any embodiment may be implemented:

The "optical on period" duration may be calculated as sending time+medium transmission delay+processing delay on receiving nodes. The predefined duration may then be chosen to be above this minimum time, e.g. 1 s.

The algorithm may be required to differentiate between lighting units and other network nodes (e.g. sensors, actuators, controllers, computers, etc.) without a lighting element 12 which may be in their range. This may be achieved e.g. by adding a "node type" field to the device address sent in the clustering frame over the radio. However, this may already be covered by underlying network stack (e.g. device and service discovery mechanisms already provided by ZigBee).

The algorithm may be required to cluster other network nodes (e.g. sensors, actuators, controllers, computers, etc.), with only unidirectional optical communication capabilities, i.e. without an optical receiver 18 or without a lighting element 12. Depending on the optical communication capabilities of these control elements, the protocol can be adapted to assign them to clusters based solely on the detection of their clustering messages by lighting units or by additional messages, respectively. To adapt the procedure accordingly, the optical communication capabilities of these control nodes must be known at least to their neighbor nodes, e.g. via capabilities field included in the clustering message.

The features of both centralized and decentralized algorithm can be combined, in that the node "i" to be clustered first broadcasts >hello "i"< message, then receives "hello response" messages from its cluster mates "n", and only then sends a unicast "clustering message" to a successor node, selected according to the rules defined by the distributed algorithm (preferably not a cluster mate).

In the preferred embodiment above, RF and optical communications are interleaved. However, if each lighting unit were capable of modulating light so that it carries information (e.g. in an on/off keying sequence, flux modulation, color or duration changes), it could e.g. transmit its unique ID over the optical link. Then, after the reception of the triggering "prepare for clustering" message, any further communication over the standard communication medium will not be necessary if the nodes could otherwise agree on the clustering order (assuming the "clustering slot duration", being the intended maximum duration needed for a lighting unit to "introduce" itself to the network via optical communication, is known). The clustering order may be chosen in a variety of ways. If the nodes are organized in some kind of logical structure (as e.g. in ZigBee: a tree with the PAN coordinator as the root), the clustering algorithm may follow this logical structure, (e.g. in the ZigBee example: starting from the PAN-Coordinator down to the leaf nodes). Alternatively, the ZigBee scheme of hierarchical addressing can be deployed: each of the nodes is already uniquely identified in a network topology, the scheduled time slot for each lighting unit or switch can be specified, e.g. as a node address multiplied by the "clustering slot duration". Instead of node address, a randomly selected number could be used. Also, any of the scheduling algorithms (e.g. following the concept of "flooding algorithms") as known in the art can be used.

While all lighting units 40-54 in the above description were communicating over the RF link, it is alternatively possible to employ lighting units of the type shown in FIG. 2, which communicate over the powerline communication unit 16'.

Secure Network Configuration

According to a second aspect of the invention, the lighting units (as well as other network nodes such as switches, sensors, controllers) may automatically be organized into a network in a secure manner. Security is achieved by using optical communication, which by light propagation characteristics is limited within a bounded topological area e.g. a room delimited by (non-transparent) walls.

For this, the network nodes are required to transmit some amount of information over the optical link. For the simple, single-color lighting elements 12, which flux cannot be changed very frequently (e.g. HID lamps), it could be achieved by controlling the light on duration, so that it matches the required information (e.g. if the information to be transmitted is "198", the lamp could be turned on for 198 10 ms-slots, i.e. for 1.98 s). This requires the optical receiver 18 to be capable of measuring the optical signal duration (e.g. with a timer or counter). This is the preferred embodiment, as this simple method applies to any other light source as well.

For the simple, single-color lighting elements 12, which could allow for slow flux changing (e.g. incandescent lamps), e.g. slow on/off keying could be used, e.g. with bit duration of 2 s (if time is not an issue). This will require the optical receiver 18 to be able to read this on/of keying (e.g. store it in a shift register).

Finally, for very flexible light sources (e.g. LEDs) a complex time-variant lighting pattern may be produced by changing other parameters of the light, e.g. light intensity or frequency or duration or any combination thereof. This will of course require an appropriate optical receiver 18, capable of measuring the modulated parameter.

The resulting security level depends not only on the amount of information transmitted over an optical link, but also on how this information is used for security bootstrap.

Authentication between the joining node and the "registrar" is preferred to be mutual, thus, information is preferably transmitted over the optical link in either direction between the two. After the information has been exchanged, both pieces are combined in a suitable way e.g. XORed, hashed, concatenated.

The resulting code data can be used for security bootstrapping in multiple ways. It could password-authenticate a Diffie-Hellman exchange over standard communication medium, e.g. according to SPEKE (D. Jablon. Strong Password-Only Authenticated Key Exchange. Computer Communication Review, ACM SIGCOMM, vol. 26, no. 5, pp. 5-26, October 1996) or DH-EKE algorithm, (S. M. Bellovin and M. Merritt, "Encrypted Key Exchange: Password-Based Protocols Secure Against Dictionary Attacks", Proceedings of the I.E.E.E. Symposium on Research in Security and Privacy, Oakland, May 1992.). It could be used in any form of Password-authenticated key agreement (S. M. Bellovin and M. Merritt. Encrypted Key Exchange: Password-Based Protocols Secure Against Dictionary Attacks. Proceedings of the I.E.E.E. Symposium on Research in Security and Privacy, Oakland, May 1992.). It could also be used to derive the key as the pairwise Master Key (e.g. ZigBee Trust Centre Master Key), or could serve as a (temporary) encryption key to transmit configuration information from the registrar to the joining node (e.g. the Master Key, the network key etc.), or could be used as the pairwise Master Key (e.g. ZigBee Trust Centre Master Key). Depending on the required level of security and the density of networks, appropriate mechanisms may be selected accordingly.

In a first step, after power-up, an unconfigured network node starts up in "discovery mode". During this phase, the node first attempts to associate with the existing network via the standard communication medium.

If a node can detect an existing network, it announces itself to the network using standardized mechanisms (e.g. ZigBee/IEEE802.15.4) and proceeds with the security bootstrapping procedure.

If a node cannot detect any existing network, it creates a network on its own, e.g. by sending out said a ZigBee beacon message, or any other suitable self-announcement message and listens to discovery messages by not yet configured nodes. If it detects another not configured node, it proceeds with the security bootstrapping procedure.

Whenever the self-announcement message ("I'm new") of a new node is received by a configured network node, this configured node and assumes the role of "challenger" for the joining node and sends a broadcast message into the network, indicating that a new node desires to be configured.

Optionally, from this point in time, until configuration is complete (or aborted), no further configuration requests will be accepted.

The challenger sends a "signal" command to the new node, triggering it to send pre-defined information over optical link.

The information is observed by the network nodes only if no obstacle is present to hinder light propagation between the joining node and the other network nodes (e.g. walls and ceilings). It should be noted that within the same building or even room it is possible that some, but not all configured nodes in the network observe the sequence (e.g. in an L-shaped room).

Those of the configured network nodes that have received the information over optical link, report this event back to the challenger. The challenger then selects one of them (e.g. the first node reporting the event), and appoints this node to assume the role of "registrar" for the joining node (Note, that the role of registrar my also be assumed by the "challenger" node itself).

The registrar establishes a secure relationship with the new device. To do this in a secure manner, i.e. with authentication of the new node, the information is exchanged between the new node and the registrar via the optical link. Because the optical link is limited to physical boundaries of the room, only nodes present in the same room during this configuration step, which may safely be assumed to be genuine, will be authenticated.

Example of Secure Network Configuration

Figure 6:
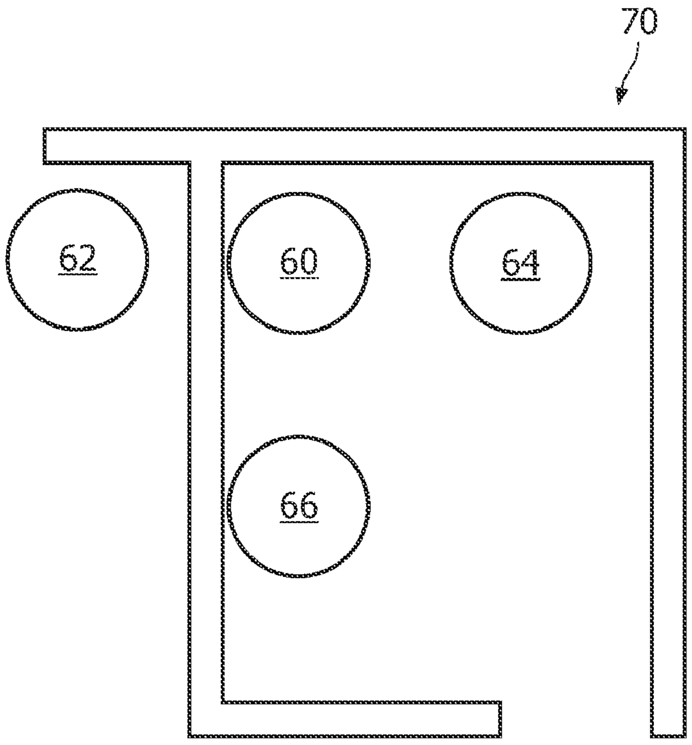
FIG. 6 gives a symbolical representation of a embodiment of a lighting system with lighting units installed in a building.

FIG. 6 shows a symbolical representation of a building 70. Within the building 70, there are four lighting units 60, 62, 64, 66 of the type shown in FIG. 1. They are simple halogen lamps, so they use light duration control for transmitting information over an optical link. From these four lighting units three lighting units 60, 62, 64 are already configured as a ZigBee network.

Figure 7:
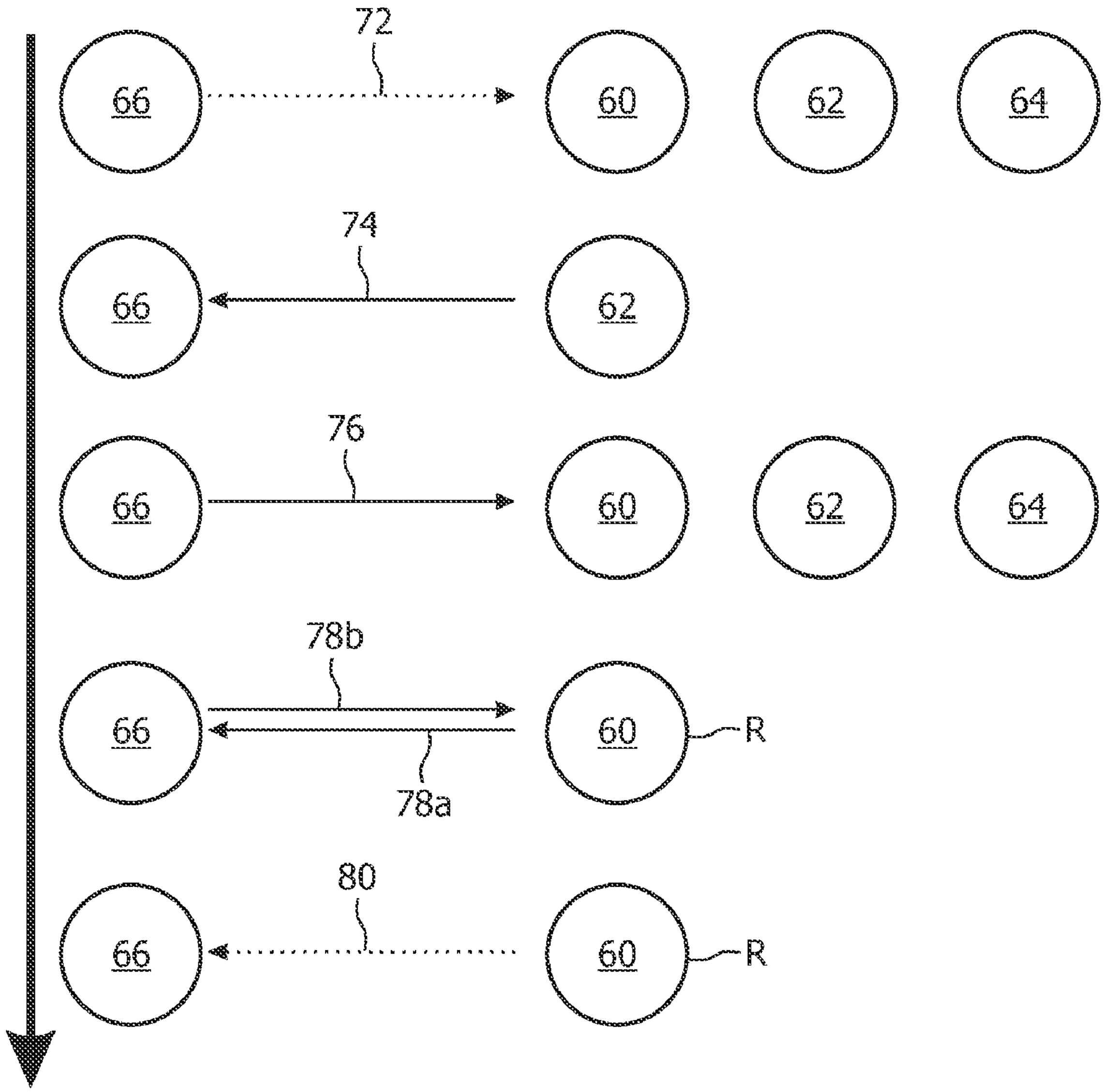
FIG. 7 shows a symbolical representation of communications during configuration of a lighting system in a network.

The exchange of signals during configuration is shown in FIG. 7, where RF messages are shown as dotted lines and optical signaling is shown as solid lines. Lighting unit 66 starts with a "hello" message 72. From the configured lighting units 60, 62, 64, lighting unit 62 is chosen as the challenger.

Challenger 62 broadcasts on the network a "signal" command 74, causing joining node 66 to switch on its lighting element 12 for a duration of 56*10 ms=560 ms, to encode the predetermined value "56" (message 76) and the network nodes 60, 64 to prepare for receiving optical communication.

Message 76 is only observed by nodes 60, 64, but not by node 62. Obviously, node 62 has no optical connection to the joining node 66. The nodes 60, 64 report their observation of the message 76 ("56") to challenger 62, which selects node 60 as registrar R.

Registrar 60 generates a first random value "183" and transmits it to the joining lighting unit 66 by turning on its lighting unit 12 for the duration of 1.83 ms (message 78*a*). The joining lighting unit 12 receives and stores the message 78*a*. In turn, it generates a random value "027" and transmits it as message 78*b*. Both the registrar 60 and the joining node 66 then put together the random sequences (in this example by simple concatenation) to have a shared secret code of "183027".

In the following, this secret code is used as a temporary key, which is subsequently used to encrypt configuration data 80 (Trust Centre Master Key for ZigBee/IEEE 802.15.4) sent from the registrar to the joining node over the standard communication medium. If the key length is not sufficient, the value "183027" may be hashed to obtain a temporary key.

Possible Variants for Secure Network Configuration

There are also some alternative ways and extensions as to how the clustering algorithm according to any embodiment may be implemented:

The information transmitted by the joining lighting unit 66 in response to the "signal" message need not be a fixed, predetermined sequence. Alternatively, it is also possible to encode data in this sequence, which is used in the communication, e.g. (part of) the MAC-Address of the joining lighting unit.

While in the above description, all lighting units are communicating over the RF link, it is alternatively also possible to employ lighting units of the type shown in FIG. 2, which communicate over the powerline communication unit 16'.

While in the previous examples the two aspects of the invention have been described separately, it is of course possible to combine the two. Thus, a lighting system using secure network configuration by authentication over the optical link may further use one of the above-described automatic clustering procedures to configure the nodes into groups.

In the foregoing, it will be appreciated that reference to the singular is also intended to encompass the plural and vice versa, and references to a specific number of features or devices are not to be constructed as limiting the invention to that specific number of features or devices. Moreover, expressions such as "include", "comprise", "has", "have", "incorporate", "contain" and "encompass" are to be construed to be non-exclusive, namely such expressions are to be construed not to exclude other items being present.

Although the present invention has been described in connection with specific embodiments, it is not intended to be limited to the specific form set forth herein. Rather, the scope of the present invention is limited only by the accompanying claims.

Reference signs are included in the claims, however the inclusion of the reference signs is only for clarity reasons and should not be construed as limiting the scope of the claims.

The invention claimed is:

1. A lighting system, comprising a plurality of lighting units, each lighting unit comprising a lighting element for generating light, a lighting control unit for controlling the light output of said lighting element, a communication unit for sending and receiving communication signals over a communication medium, an optical receiver to receive the light from other lighting units, a controller unit connected to said optical receiver, communication unit, and lighting control unit, where in said lighting units, said controller is programmed to operate said lighting units to group said lighting units in one or more clusters by the following steps:

in a first lighting unit, turning on said lighting element to emit light, generating cluster information, depending on whether or not said emitted light is observed by optical receivers of further ones of said lighting units, and communicating between said communication unit over said communication medium to achieve alignment.

2. A method of controlling a lighting system said lighting system comprising a plurality of lighting units, each of said lighting units comprising a lighting element for generating light, a communication unit for communicating over a communication medium, and an optical receiver to receive light from other lighting units where said lighting units communicate over said communication medium, and where, at least in a configuration phase, at least one of said lighting units sends information by operating said lighting element in a controlled manner, and at least one further lighting unit receives said information by observing said generated light, where said lighting units are grouped in one or more clusters by means of the following steps:

in a first lighting unit, turning on said lighting element to emit light, and generating cluster information depending on whether or not said emitted light is observed by optical receivers of further ones of said lighting units.

3. The method according to claim 2, where said steps are repeated for a plurality of lighting units, where each time the lighting element of a different lighting unit is turned on.

4. The method according to claim 2, where said lighting system is installed in a building with a plurality of rooms, and said lighting units are grouped in a plurality of clusters, where all lighting units in the same room are assigned to the same cluster.

5. The method according to claim 2, where said lighting system further comprises a central unit comprising at least a communication unit for communicating over said communication medium, where said central unit sends commands over said communication medium to said lighting units to conduct said steps, where at least one of said lighting units sends detection information to said central unit, indicating whether or not said emitted light is observed, where said detection information is used to generate said cluster information, and said cluster information is stored at said central unit.

6. The method according to claim 2, where at least one of said lighting units further comprises storage means for storing a cluster table, where at least part of said cluster information is stored in said cluster table.

7. The method according to claim 2, where a joining lighting unit sends a detection signal by controlling its lighting element to emit light in a modulated sequence, among said lighting units which receives the detection signal by observing the light emitted from said joining lighting unit, a registrar (R) is chosen, and code data is exchanged between said registrar (R) and said joining lighting unit.

8. The method according to claim 2, where code data comprises at least a first code which is transmitted from said lighting unit to a joining lighting unit, and a second code which is transmitted from said joining lighting unit to said lighting unit.

* * * * *